Patented Sept. 29, 1953

2,653,893

UNITED STATES PATENT OFFICE 2,653,893

METHODS OF APPLYING OLIGODYNAMIC SILVER AND ARTICLES PRODUCED THEREBY

Isabella B. Romans, Lafayette Hill, Pa.

No Drawing. Application August 20, 1948, Serial No. 45,442

4 Claims. (Cl. 167—14)

The present invention relates to articles and more specifically containers having germicidal and/or bacteriostatic effects on its contents and to a process of treating such articles as containers so that they will have such effects.

Certain metals have so called oligodynamic effect (i. e. germicidal or antiseptic effect) when brought into contact with germ-containing liquids. Silver is best suited as an oligodynamic material.

In accordance with the present invention, it is proposed to deposit oligodynamically active silver on the inner surface of a container to preserve the contents of the container. The container, oligodynamically activated as described, may be of the type employed for storage of biological products, for medicinal products and for ampules or vaccine bottles. Also, the containers of the present invention may be employed to store and preserve milk, fruit juices, vegetables, soups or other food products.

One simple, safe and economical method of depositing oligodynamic silver on the inside of a container in accordance with certain process features of the present invention, is to rinse the container with a saturated or supersaturated aqueous solution of silver oxide. I have found that such a solution under certain conditions, deposits oligodynamic silver on the inner surface of a container while in contact therewith from approximately one to five minutes. The active silver is adsorbed on the surface of the container and remains thereon after the silver oxide solution has been drained off. When the container so treated is filled with the contents to be preserved, the active adsorbed silver goes into solution and activates these contents, so that it has a lethal effect on bacterial life in said contents. Oligodynamic silver, in accordance with the present invention, is active in .01 to 1.0 part per million of water by weight, and the amount deposited on the container wall would not be visible, would be difficult to detect by chemical analysis and can be detected by bacteriological tests for germicidal activity.

I have found that in the treatment of the container when a saturated and/or supersaturated solution of silver oxide containing solid silver oxide is continuously permitted to flow into the container, the period of contact should not be extended unduly, since prolonged contact with silver oxide reduces the oligodynamic effectiveness of the silver deposit. The optimum time of contact varies inversely with the amount of silver oxide present. That is, the smaller the amount of silver oxide, the longer the contact permissible before activity of the silver deposit is reduced. Heat facilitates the deposition of oligodynamic silver from silver oxide solution and appears to prevent the deleterious effect of extended contact with the silver oxide solution.

Treatment with silver oxide solution, as described, is highly economical, because silver oxide is one of the cheapest sources of silver, it is one of the most stable silver compounds and is practically insoluble so that none would be lost except that adsorbed on the container wall.

Where the container is to hold saline solutions, the maximum amount of oligodynamic silver deposited on the inner wall surface of the container should not exceed the solubility of silver chloride that might be formed from it. This is important, especially in connection with containers to be used for biological products. Sodium chloride is used in a great many biological products intended for parenteral use, i. e. administration by any method other than by mouth such as intravenous or intramuscular injection. Silver reacts with all chlorides, even sodium chloride, to form insoluble silver chloride. If the amount of silver deposited on the container wall were sufficient to form undissolved silver chloride, the precipitated silver chloride would cause undesirable effects, such as thrombosis, if the product were injected into human beings. This is one reason why silver oxide is a highly desirable compound for use in connection with the present invention, especially when a saturated solution is used. There is not sufficient silver in the saturated solution used to deposit oligodynamic silver on the container wall to precipitate silver chloride. By using a saturated silver oxide solution, there would be assurance that the amount of silver deposited on the glass is not sufficient to form a silver chloride precipitate in the presence of a saline solution. Therefore, the method of the present invention when using a saturated silver oxide solution, automatically restricts the amount of oligodynamic silver deposited within a safe range.

Containers intended for the storage of food, beverages and the like do not require the precautions of limiting the amount of deposited oligodynamic silver to an amount necessary to prevent precipitation of silver chloride. Where larger amounts of deposited oligodynamic silver are required as a preservative for milk, fruit juices and other foods, and where precipitation of silver chloride is not so undesirable, the amount deposited from the silver oxide solution may be increased by acidifying silver oxide with nitric acid.

In the application of the invention to ampules, these ampules may be moved continuously while in upside-down position and spray nozzles extending upwardly into said ampules and moving with said ampules may be made to stream the silver oxide solution continuously into said ampules. The resultant washing with silver oxide solution is continued long enough to effect the required deposit of oligodynamic silver on the inner surface of the ampules, as for example, by filling with a silver oxide solution and emptying after an interval.

Other methods may be employed to apply the silver oxide solution to the container to be treated. In every case where silver oxide solution is employed as the activating liquid, the solution desirably should be saturated. The solution should desirably be prepared by placing silver oxide in water, agitating and filtering off the excess. If desired, a silver oxide filter could be used to produce a saturated silver oxide solution.

A container rinsed with a saturated solution of silver oxide with a contact time of one to five minutes or even less under certain conditions, deposits a layer of oligodynamic silver sufficient to sterilize a suspension of *Staphylococcus, aureus* which is the usual test organisms used because it is one of the most resistant of the non-spore forming pathogens, containing 0.1 cc. of a 24 hour broth culture per 10 cc. water in 72 hours. That would be approximately 35,000,000 organisms, much more than would ever be expected to contaminate biological products.

Another method of depositing oligodynamic silver would be to immerse silver electrodes charged with a low voltage of electricity in water. This water would contain enough silver to deposit active quantities on glass. Water so prepared may be used in the manner indicated in connection with silver oxide solutions.

Although the invention is primarily intended to be employed in connection with glass containers, as far as certain aspects of the invention are concerned, the container on which the oligodynamic silver may be deposited may be of paper, cellulosic material, clay, porcelain or other suitable inert materials or may be internally coated with these materials.

As far as certain aspects of the invention are concerned, the present invention could also be used for treating glassware employed in operating rooms. For that purpose, all glassware such as flasks, beakers, syringes, etc. could be rinsed with a saturated solution of silver oxide or any solution containing oligodynamic silver just before they are sterilized. Even towels rinsed in such a manner would adsorb enough oligodynamic silver to be bacteriostatic. This could be accomplished by putting silver oxide in the distilled water storage tank, being sure to filter out all solid silver oxide before the solution is used or by placing a silver oxide filter in the distilled water pipe. This solution could also be used to make bacteriostatic and/or germicidal solutions of saline, novocaine, etc.

Also, as far as certain aspects of the invention are concerned, such articles as gauze, diapers, towels, bed linen, etc. may be rendered bacteriostatic by rinsing them in silver oxide solution.

In the following claims, by a deposit of oligodynamic silver is meant not only a deposit of pure silver or silver ion, but also a deposit of silver compound having oligodynamic properties.

While the invention has been described with particular reference to specific embodiments, it it to be understood that it is not to be limited thereto but is to be construed broadly and restricted solely by the scope of the appended claims.

What I claim is:

1. A method of treating a container to preserve its contents, comprising treating at least the inner surfaces of the container with an ionic aqueous solution of silver oxide so as to wet the same for about 1 to 5 minutes, thereby depositing an invisible layer of ionic oligodynamic silver on the surface of the contacted portions, the concentration of said solution being at least saturated, and thereafter drying the container.

2. A cellulosic article having an invisible coating of oligodynamic silver on its surface formed by treating it with an ionic aqueous solution of silver oxide so as to wet the same for about 1 to 5 minutes, the concentration of said solution being at least saturated, and thereafter drying.

3. A method of treating a container to preserve its contents, comprising treating at least the inner surfaces of the container with a solution of silver oxide acidified with nitric acid so as to wet the same for about 1 to 5 minutes, thereby depositing an invisible layer of ionic oligodynamic silver on the surface of the contacted portions, the concentration of the silver oxide being sufficient to be at least saturated prior to the addition of the nitric acid thereto, and thereafter drying the container.

4. A cellulosic article having an invisible coating of oligodynamic silver on its surface formed by treating it with a solution of silver oxide acidified with nitric acid so as to wet the same for about 1 to 5 minutes, the concentration of the silver oxide being sufficient to be at least saturated prior to the addition of the nitric acid thereto, and thereafter drying.

ISABELLA B. ROMANS.

References Cited in the file of this patent

UNITED STATES PATENTS

| Number | Name | Date |
| --- | --- | --- |
| 1,557,235 | Bechhold | Oct. 13, 1925 |
| 1,642,089 | Schreier | Sept. 13, 1927 |
| 2,071,625 | Haas et al. | Feb. 23, 1937 |
| 2,283,883 | Couconi | May 19, 1942 |

FOREIGN PATENTS

| Number | Country | Date |
| --- | --- | --- |
| 180,973 | Great Britain | Nov. 21, 1922 |